March 3, 1959     J. F. HUNTER     2,875,981

SHADE OPERATING MECHANISM

Filed Sept. 16, 1955

INVENTOR:
JAMES F. HUNTER
BY
Morrison Kennedy & Campbell
ATTORNEYS.

United States Patent Office

2,875,981
Patented Mar. 3, 1959

2,875,981

SHADE OPERATING MECHANISM

James F. Hunter, New Rochelle, N. Y., assignor to Rosemary M. Hunter, New Rochelle, N. Y.

Application September 16, 1955, Serial No. 534,835

6 Claims. (Cl. 254—190)

This invention relates to a cord operated mechanism for controlling adjusting devices for window shades, awnings, Venetian blinds and the like. Such mechanisms are operated by a continuous cord passing over a pulley attached to the blind and having a brake mechanism. This cord has commonly been made of a braided or twisted strand, formed into a continuous cord by attaching the ends together by a metal fastener. Difficulty has been experienced in using such a cord with the mechanisms heretofore employed, in that the fasteners have tended to "creep" upward on the lesser tension side to the point where the shade cannot be pulled all the way up.

In my companion application, Serial No. 499,731, filed April 9, 1955, I have overcome this difficulty by a special mechanism employing an elastic cord, preferably made of rubber or the like. The common braided or twisted cords are relatively ineffective in that invention, since their extension-elasticity is low, and they contract in diameter only a little when pulled.

Cotton cords, however, are more economical to use. In accordance with this invention I have discovered how, by modifying the mechanism, to use other special properties which such cords possess to accomplish the desired results. Such cords when compressed longitudinally, loosen their strands and swell in diameter. The mechanism herein is designed to take advantage of that fact. Such fabric cords have, however, a limitation that they have little or no tack or natural adhesion to metal surfaces and a mechanical tie must be established.

In accordance with this invention these facts are utilized to expand the cord in such a way as to engage the pulley and brake mechanism, without causing the objectionable upward creep of the cord and connector.

In skeleton form, the device of this invention grasps the cord at spaced points by radial lugs angularly spaced around the axis of the pulley and then moves the cord held between these gripped points in toward the axis, thus compressing the cord longitudinally and thereby tending to expand the diameter of the cord. This principle is used to obtain a firm grip on the cord, not only by the rotating lugs, but also by the brake mechanism. These lugs comprise elements forming a plurality of channels of uniform width arranged in radial planes about the axis or shaft, the cord entering the channels at the outer ends and sliding toward the axis without any slip in the direction of the cord.

Figure 1:
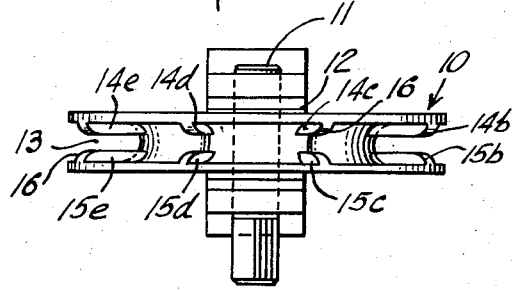
Figure 5:
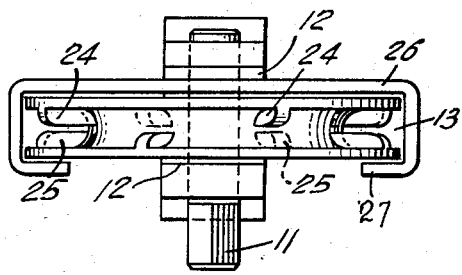
Figure 2:
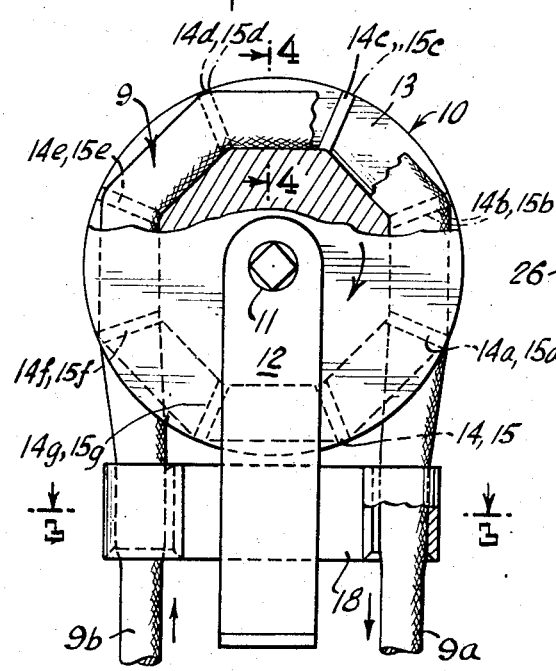
Figure 6:
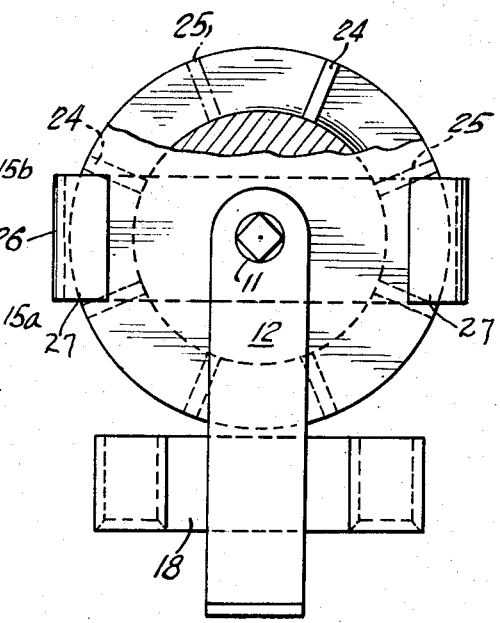
Figure 3:
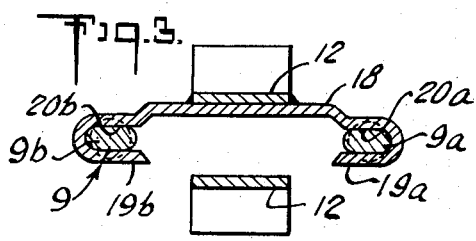
Figure 4:
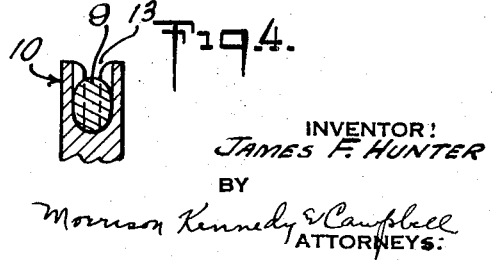

The invention, in its preferred forms, is shown in the accompanying drawing in which Fig. 1 is a top view of a first embodiment, in which the operating cord is omitted; Fig. 2 is an elevation of the device of Fig. 1, shown partly in vertical section showing operating cord; Fig. 3 is a section on line 3—3 of Fig. 2 showing guides and brake mechanism; Fig. 4 is a section on line 4—4 of Fig. 2 showing cord-lock mechanism; Fig. 5 is a top view of a second embodiment in which the operating cord is not shown and Fig. 6 is an elevation of the second embodiment, shown partly in vertical section and in which the operating cord is not shown.

The construction of Fig. 3 is applicable to both embodiments and the numerical designations are made accordingly. The operating cord was omitted from Figs. 1, 5 and 6, so that the lugs could be shown more clearly.

The embodiment in Figs. 1, 2 and 3 is adapted for heavier loadings and slower speeds, as for example, a heavy shade or an awning. This device is operated by a cord 9 moving up and over and down from a pulley 10 mounted on a shaft 11 which is journalled in a bracket 12. The pulley 10 has a groove 13 and this is fitted with radially placed lugs 14, 14a, 14b, 14c, etc., on the far wall, and lugs 15, 15a, 15b, 15c, etc., on the near wall of the groove 13, each opposed to the corresponding lug on the far wall. The lugs having similar subscripts are arranged to operate in pairs. The opposed faces of the lugs are in planes substantially parallel to each other and perpendicular to the axis of shaft 11, and are spaced from each other a distance a little less than the free diameter of the operating cord 9. At the periphery of the pulley 10 the faces of the lugs 14 and 15 are rounded, as at 16, to ease the entrance of the cord 9 into the channels. As shown in this embodiment, the bottom of the groove 13 is straight between the pairs of lugs so that the groove is polygonal.

In a typical instance the free diameter of the cord may be about .171 of an inch and the distance between the opposing faces of the lugs .120".

Attached to the bracket 12 and below the pulley 10 is a brake mechanism comprising a bar 18 having two restricted channel guides, one to receive each of the ends, 9a and 9b, of the cord coming down from the pulley. As shown, each end of the bar is bent back upon itself, shown at 19a and 19b, and the end is spaced from the body of the bar a distance somewhat less than the free diameter of the cord, for example about .110 inch forming a guide 20a embracing cord 9a and guide 20b embracing cord 9b.

We may assume that the weight of the shade urges the pulley clockwise. Thus, in the operation of the device with the cord in place, as shown in Fig. 2, to raise the shade, a cord 9b is pulled down through the guide 20b against the pull of the weight of the shade. This counterclockwise rotation of the pulley 10 causes cord 9a to pull up through guide 20a. This urge by the shade is shown by the circular arrow.

As the pulley 10 rotates the cord 9a is gripped successively at the outer ends of each pair of holding lugs 14a and 15a and then 14 and 15; as the pulley turns further, the cord between the lugs is drawn radially in toward the axis of the pulley, sliding radially inwardly in the lugs but not circumferentially. As a result the length of the cord between each successive pair of lugs is compressed into shorter length, and consequently is urged to expand to greater diameter and is thus compressed against the wall of the groove 13 of pulley 10 and against the edges of the lug-pairs. This effect is sufficient to prevent any slippage of the cord circumferentially through the lugs around the pulley.

When the pull ceases there will be a slight retrograde movement of the cord, due to the weight of the shade. This pushing of the cord 9a at the pulley by the weight of the shade against the resistance of the restricted guide 20a creates the same type expansion in diameter just above the guide 20a as has been described and blocks further downward movement in the same way we have described within the pulley groove.

The construction of Figs. 5 and 6 is intended primarily for lighter loadings. In this form the alternate lugs on each side of the groove 13 are omitted, each remaining lug 24 or 25 on each wall of the groove being opposite the opposite wall itself of the groove and the channels are thus formed between each lug and the opposite groove wall, first on one wall and then on the other, so that the passageway for the cord moves back and forth from one side of the groove to the other.

In these figures, also there is shown a holding guide 26 carried by the bracket 12 which extends around the edge of pulley 10 enclosing the cord 9 as it enters the pulley groove, serving to guide the cord into the groove and assist in forcing it down into the groove. The ends of this guide extend inwardly in front of the pulley as shown at 27 to hold the pulley in place. If desired, the guide 26 may be provided with a curved finger (not shown) extending into the groove to assist in moving the cord toward the axis.

Considering now the first embodiment:

In operation to raise the shade one of the cords 9b is pulled by the operator causing rotation of the pulley 10, the pulled cord necessarily is the leaving cord. Consider the associated mechanism to be a window shade which is raised by a counterclockwise rotation of pulley 10. The raising of the shade causes the cord 9a passing through guide 20a to become the entering cord. The surfaces of guide 20a are spaced so that the cord is distorted into an oblong shape as indicated in Fig. 3. This produces a frictional resistance as the cord continues to pass through guide 20a. Continuing clockwise rotation from the position of pulley 10 shown in Fig. 2 causes a continuing series of repetitive changes as each pair of lugs in turn is engaged with the cord on the entering side and is disengaged from the cord on the leaving side.

As shown in Fig. 2 lugs 14 and 15 are about to come in contact with the entering cord. As this contact is completed and the lugs 14—15 have moved into the position shown as occupied by lugs 14a—15a the entering cord will have moved to the bottom of the groove between lugs 14 and 15 (now in the position shown as occupied by lugs 14a and 15a) due to the pull of the friction on cord 9a in guide 20a and to the drag of the return bend of guide 20a which is located to cause the required pull. The entering cord between the lug-pair 14—15 and the lug-pair 14a—15a will be in the condition indicated for the cord between the lug-pairs 14a—15a and 14b—15b. Because of the radial position of the lug-pairs, the cord between the pairs is shortened, as it approaches the bottom of the groove, by the position of the lugs. The shortening of the cord compresses the cord longitudinally and expands the strands against the bottom and side walls of the groove packing the space between the confining lug-pairs and crowding the strands of the cord against the sides of the lugs so that the cord is anchored from pull in either direction while the space remains filled. In this way the shade is raised by the pull of the leaving cord without slippage even in the case of very wide and heavy shades.

Coincident with the action of engaging the cord on the entering side the process of disengaging the cord is proceeding on the leaving side. The lug-pairs 14f—15f and 14e—15e are moving into the positions shown as occupied by lug-pairs 14g—15g and 14f—15f respectively. As the movement proceeds the leaving cord is moving away from the bottom of the groove and as the space between the lug-pairs increases, because of their radial positions, the cord loses its compression thereby losing its locking effect against the sides of the lugs and the leaving cord disengages evenly and smoothly as the rotation proceeds. These engaging and disengaging movements continue in repetitive sequence while the pulley is in rotation. When the rotation stops, several of the groove spaces between the lug-pairs remain filled with the compressed cord so that the pulley remains locked to the cord while it is at rest.

When the shade has been adjusted as desired and the leaving cord is released by the operator, pulley 10, under the biased loading of the shade, begins to reverse its rotation. The clockwise rotation will be resisted by the pull of the friction of guide 20b. When the bottom of the shade is at the top of the window opening and the shade is wound on the roller the load on the mechanism is light and may be held by the friction of guide 20b.

From the position of the shade where the weight of the shade pulls the operating cord through the resistance of guide 20b the stopping and holding of the shade is accomplished by the cord at guide 20a. As the pulley begins to move in the clockwise direction the cord between the guide 20a and the lug-pair, which at the time, is nearest to the position shown for lug-pair 14a—15a, being held by the friction in guide 20a, expands under compression thereby locking itself against guide 20a. As the reverse rotation tends to continue the cord is further compressed until the resistance at 20a brings the load smoothly to rest. The clockwise movement of the pulley in effecting this lock is too small to be a consideration in the adjustment of the shade.

On a downward adjustment of the shade, the leaving cord 9a is pulled through the frictional resistance of guide 20a and the clockwise rotation of the pulley, being restrained only by the friction of guide 20b, follows up so closely that the stoppage of the pulley is almost coincident with the stoppage of the pull at the completion of the adjustment.

The locking of the mechanism in this way by the cord is so effective that in handling a very wide and heavy shade it may be necessary to make a slight upward adjustment to free the lock in order that the downward adjustment can be started. After the lock has been released the retardation of the clockwise movement by the drag of the resistance of guide 20b is sufficient to permit easy and smooth operation of the leaving cord, in making the downward adjustment. When the lock has been established after an adjustment of the shade, the lock will remain effective until the cord is again pulled in the making of the next desired adjustment.

The cord and pulley movements of the device shown in the second embodiment (connected to a window shade operator) would be the same as described for the first embodiment with one exception. In the second embodiment the cord, in contact with pulley 10, occupies a zigzag position caused by the staggering of the lugs and their position alternately on opposite sides of the groove. The leaving cord crosses the center line of the groove and guide as each lug, in turn, becomes disengaged from the cord. This presents the opportunity to effect a stop by cramping the cord on the side of the guide thereby saving part of the back travel required to effect the stop with the mechanism of the first embodiment. As noted previously herein the mechanism of the second embodiment is intended for use only with lighter loads.

With mechanisms of the type being considered herein which handle loads operating in one direction only, the lifting pull includes friction and load while the lowering pull requires only friction less load. As the friction element of the pull does not change to any extent from adjustment to adjustment, the difference is twice the operational load. Again using the illustration of the window shade, the pull to raise the shade stretches the leaving cord so that the length of free cord drawn through guide 20b to effect a definite adjustment of the shade is less than the length of free cord returned through same guide 20b when the shade is lowered an equal distance. Guide 20b has an open side. The cord as it leaves through the guide 20b is stretched by the pull and the cross section of the cord is reduced. In the compensating downward adjustment the free cord entering the guide 20b is larger than the cross section of the stretched leaving cord. For an equal adjustment of the shade upward and downward the movement of the pulley is the same. The net result is an excess of cord between guides 20b and 20a which excess is passed through guide 20a in the next downward adjustment of the shade.

At guide 20a the effect is the same. The length of free cord which is passed through guide 20a on a downward adjustment is greater than the length of free cord passed through the guide on a compensating upward adjustment because of the partial compression of the leaving cord on a downward adjustment. When the shade is adjusted at the top of the window opening the load is lighter and under this condition the "creep" is negligible. When the load is sufficient to produce movement it is in the same direction at both guides 20a and 20b and is in the direction of the movement of the cord in making a downward adjustment of the shade. It is these factors which eliminate the objectionable type of creep to which we have referred.

What is claimed is:

1. A device of the character described for use with a cord adapted to expand in diameter when longitudinally compressed, comprising a bracket, a pulley journalled in said bracket having a circumferential groove therein, lugs upon the walls of said groove defining a plurality of channels each extending radially from the bottom of said groove to the periphery thereof, each of said channels being of a constant width less than the diameter of said cord, said channels being circumferentially spaced from each other thereby dividing the groove into a plurality of sections, each said section having width greater than the full diameter of the cord.

2. A device according to claim 1 wherein each channel is defined by a pair of parallel radial lugs rounded off at the periphery of the pulley.

3. A device according to claim 1 wherein each channel is defined by the inner face of a lug on one wall of the groove and the opposite wall of the groove to which it is parallel and said lugs are placed alternately upon one wall and the other, around the pulley.

4. A device according to claim 1 having a holding bar attached to said bracket across the face of the pulley and extending across the groove of the pulley, beyond the periphery thereof, to direct the cord into said channel.

5. A device according to claim 1 in combination with a lock bar mounted on said bracket, having channels in position to receive the ends of a cord passing to and from the pulley, each of said channels having two sides spaced apart a distance less than the free diameter of the cord.

6. A device according to claim 5 in which said last mentioned channels have each an open end.

References Cited in the file of this patent

UNITED STATES PATENTS

| | | |
|---|---|---|
| 361,573 | Baville | Apr. 19, 1887 |
| 1,106,132 | Comes | Aug. 4, 1914 |
| 2,041,892 | Wiener | May 26, 1936 |
| 2,174,994 | Nelson | Feb. 11, 1939 |
| 2,656,126 | Kingsbury | Oct. 20, 1953 |

FOREIGN PATENTS

| | | |
|---|---|---|
| 314,927 | Germany | Oct. 18, 1919 |
| 828,130 | France | May 11, 1938 |